C. W. & J. T. KEMPER.
STEERING WHEEL HAND WARMER.
APPLICATION FILED APR. 17, 1917.
1,276,930.
Patented Aug. 27, 1918.
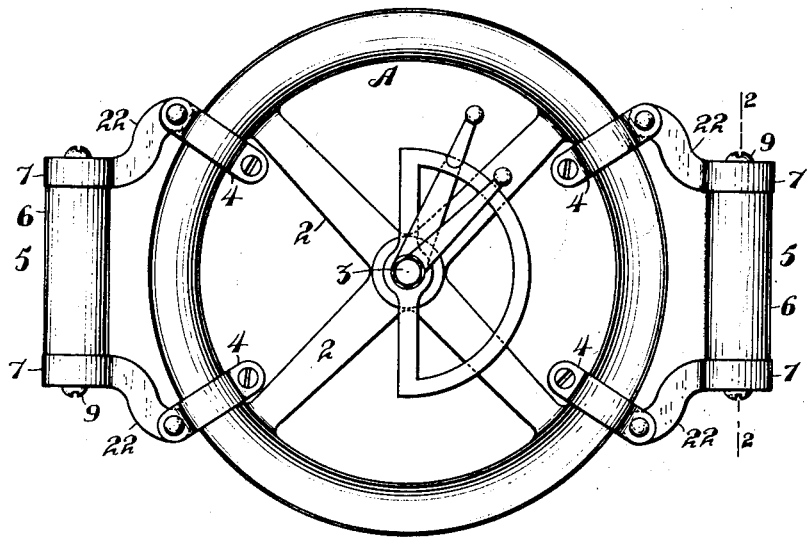
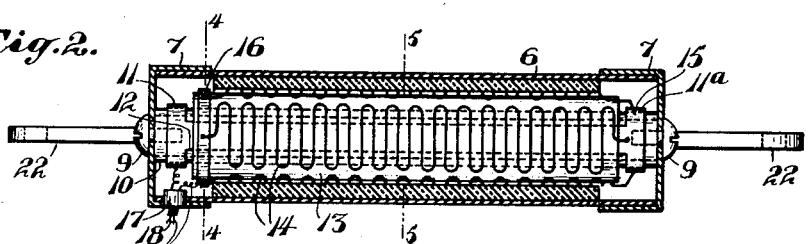
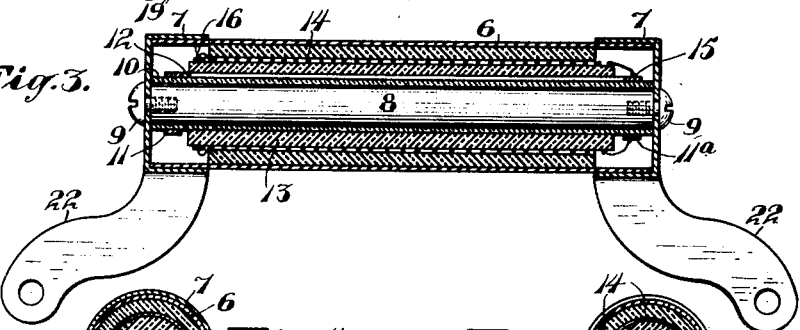
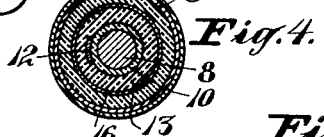
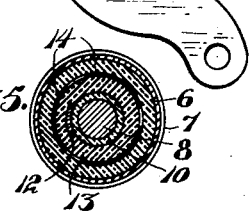
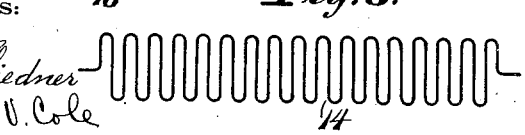
WITNESSES:
F. C. Fliedner
Frances V. Cole
INVENTORS:—
Charles W. Kemper,
John T. Kemper,
BY Strong & Townsend
ATTORNEYS

UNITED STATES PATENT OFFICE.

CHARLES W. KEMPER AND JOHN T. KEMPER, OF OAKLAND, CALIFORNIA.

STEERING-WHEEL HAND-WARMER.

1,276,930.  Specification of Letters Patent.  Patented Aug. 27, 1918.

Application filed April 17, 1917. Serial No. 162,766.

*To all whom it may concern:*

Be it known that we, CHARLES W. KEMPER and JOHN T. KEMPER, citizens of the United States, residing at Oakland, in the county of Alameda and State of California, have invented new and useful Improvements in Steering-Wheel Hand-Warmers, of which the following is a specification.

This invention relates to a steering wheel hand warmer.

One of the objects of the present invention is to provide a pair of simple, detachable handles adapted to be applied to steering wheels of motor cars and like vehicles, which can be conveniently grasped to steady and turn the wheel while driving, and particularly to provide electrically operated heating elements within the handles for the purpose of warming the hands while driving. Further objects will hereinafter appear.

The invention consists of the parts and the construction and combination of parts as hereinafter more fully described and claimed, having reference to the accompanying drawings, in which—

Figure 1 is a plan view of a steering wheel, showing the application of the invention.

Fig. 2 is an enlarged central longitudinal section on line 2—2 of Fig. 1.

Fig. 3 is a similar section taken at right angles to Fig. 2.

Fig. 4 is a cross section on line 4—4 of Fig. 2.

Fig. 5 is a cross section on line 5—5 of Fig. 2.

Fig. 6 is a plan view of one of the heating elements.

Referring to the drawings in detail, A indicates a rim of a standard form of steering wheel such as is generally employed on motor cars and like vehicles, 2 the spokes, and 3 the steering post. Secured to the rim proper, on opposite sides thereof, by means of clamps 4, is a pair of handles 5, there being one on each side. These handles are identical in construction and consist of a metal tube 6 secured in a pair of head members 7 which are held together upon the tube against endwise movement by a central rod 8 and screws 9 extending through the ends of the heads.

Wound around the rod 8 or slipped over same is an insulating tube 10, and secured on each end of said insulating tube is a metal ring, such as shown at 11 and 11ª, respectively. Connecting the two rings is a conductor which may be in the form of a wire, but preferably is here shown in the form of a flat thin metal strip 12. The purpose of this connecting conductor will hereinafter be described.

Wound about the first insulating tube 10 and the metal conductor 12 is a second insulating layer 13, in the form of a tube, and surrounding said tube and running parallel with same is a plurality of heating elements 14. One end of each heating element is connected with the ring 11ª, as shown at 15, while the opposite end of each heating element is connected with a metal ring 16 (see Fig. 2). A third layer of insulating material, preferably mica, is then wound about the heating elements to secure the elements in spaced relation as regards each other and to insulate the elements from the exterior tube 6.

Extending through one of the heads 7 is a hollow insulating bushing 17, through which extends a pair of wires 18 and 19 which are connected with a suitable source of current supply, as a storage battery or the like. The wire 18 is connected with the ring 11 while the wire 19 is connected with the ring 16. A circuit established through the wires 18 and 19 will, therefore, first enter the ring 11 and then pass through the conductor 12 to the ring 11ª. The current will then enter each heating element and flow through same to the ring 16 which, as previously described, is connected through the wire 19 with the source of supply. A parallel circuit connection through the heating elements between the rings 11ª and 16 is in this manner established which causes each element to be evenly heated.

The wires 18 and 19 passing out through the bushing 17 may be carried down the steering post 3 and any suitable form of switch may be interposed on the circuit within convenient reach of the driver, so that the current may be readily switched on or off as necessity demands. While practically any form of heating element may be employed, we prefer a tortuous winding, such as shown in Fig. 6, as this can be easily connected between the rings 15 and 16 and at the same time permits a more even distribution of the heat, For the purpose of conveniently securing the handles to the wheel a curved bracket arm 22 is formed on each head member 7. This bracket carries the clamping members 4 and as each clamping member is pivotally secured to the brackets 22, it can readily be seen that the handles can be fitted to practically any wheel, whether small or large in diameter. The handles when applied not only form convenient members for steadying and turning the wheel while driving but as they can be heated to practically any temperature desired, it can readily be seen that the hands of the driver can be kept warm under all weather conditions.

In actual practice we have found that it is only necessary to turn on the current for a few minutes. The handles will then become uncomfortably hot, in this manner warning the driver to turn off the current. The heat thus generated is conducted and radiated very slowly and it is, therefore, retained through a considerable time period and often as long as fifteen minutes to a half hour, depending upon the temperature of the atmosphere. The current consumption is in this manner reduced to a minimum as it is only necessary to turn on the current for a few minutes to raise the temperature of the handles to the desired degree.

The handles are otherwise simple in construction, cheap to manufacture and as they can be quickly applied to or detached from any steering wheel, it can readily be seen that a convenient article has been provided for the use of the average driver. The handles may remain permanently on the wheel, if desired, as they are ornamental and also render the steering wheel more easy to handle.

The materials and finish of the several parts of the device are such as the experience and judgment of the manufacturer may dictate.

We wish it understood that various changes in form, proportions and minor details of construction may be resorted to within the scope of the appended claims and that we do not wish to limit ourselves to the specific design and construction here shown.

Having thus described our invention, what we claim and desire to secure by Letters Patent is—

1. An electric heating element comprising an insulating core, a metal ring on each end of the core connected by a conductor, an insulating tube surrounding the conductor, a metal ring secured on one end of said tube adjacent to one of the first-named rings, a pair of wires connecting said adjacent rings with a source of current supply, and a plurality of separated heating elements surrounding the insulating tube and running parallel with same, said elements being connected at one end with the metal ring surrounding the insulating tube and at the opposite end with the first-named ring farthest removed from the adjacent rings.

2. An electrically heated handle for steering wheels comprising a metal tube, a head member closing each end of the tube, a tie rod connecting the heads, an insulating member inclosing said rod, a plurality of interspaced heating elements carried by the insulating member, each element comprising a tortuous wound wire extending from end to end of the insulating member, a terminal member on each end of the insulating member with which the terminal ends of the heating elements are connected, wires connecting the terminal members with a source of current supply and an insulating member interposed between the heating elements and the metal tube.

3. An electrically heated handle for steering wheels, comprising a metal tube, a head member closing each end of the tube, a tie rod connecting the heads, an insulating member inclosing said rod, a metal ring secured on each end of said insulating member, a flat metal strip forming a connection between the same, an insulating tube surrounding said flat metal strip and the first named insulating member, a plurality of heating elements surrounding and running parallel with the insulating tube, means connecting one end of each heating element with one side of a circuit, a connection formed between the opposite ends of each heating element and one of the first-named metal rings, and means connecting the opposite of said metal rings with the other side of the circuit.

4. An electrically heated handle for steering wheels, comprising a metal tube, a head member closing each end of the tube, a tie rod connecting the heads, an insulating member inclosing said rod, a metal ring secured on each end of said insulating member, a flat metal strip forming a connection between the same, an insulating tube surrounding said flat metal strip and the first named insulating member, a plurality of heating elements surrounding and running parallel with the insulating tube, means connecting one end of each heating element with one side of a circuit, a connection formed between the opposite ends of each heating element and one of the first-named metal rings, means connecting the opposite of said metal rings with the other side of the circuit, and a mica tube interposed between the metal tube forming the handle and surrounding the heating elements.

5. An electrically heated handle for steering wheels, comprising a tube-like container, a head member closing each end of said tube, a tie rod connecting the heads, an insulating member including said rod, a metallic ring on each end of said insulating member, a plurality of heating elements running parallel with the insulating member, the terminal ends of said elements being connected with the metal rings, and wires connecting the rings with a source of current supply.

6. An electrically heated handle for steering wheels, comprising a tube-like container, a head member closing each end of said tube, a tie rod connecting the heads, an insulating member including said rod, a metallic ring on each end of said insulating member, a plurality of heating elements running parallel with the insulating member, the terminal ends of said elements being connected with the metal rings, a metallic strip connected with one ring extending to a point adjacent to the other ring, wires connecting said metallic strip and the adjacent ring with a source of current supply, means for insulating said metallic strip from the heating elements, and means for insulating the strip, rings and heating elements from the tubular container.

7. In an electrically heated handle for steering wheels, an insulating tube, a plurality of interspaced heating elements carried by said tube, each element comprising a tortuous wound wire extending from end to end of the tube, a metal ring on each end of the tube to which the terminal ends of the heating elements are connected and wires connecting the metal rings with a source of current supply.

In testimony whereof we have hereunto set our hands in the presence of two subscribing witnesses.

CHARLES W. KEMPER.
JOHN T. KEMPER.

Witnesses:
JOHN H. HERRING,
THOS. CASTBERG.